United States Patent [19]
Bailey et al.

[11] Patent Number: 5,468,968
[45] Date of Patent: Nov. 21, 1995

[54] AIR QUALITY MONITORING SYSTEM AND PROCESS

[75] Inventors: William H. Bailey; Lonnie L. Byers, both of Johnson City; Robert G. Holley, Jonesborough; James M. Lamie, Erwin; Robert M. Sparks, Elizabethton; Mike L. West, Johnson City; Richard P. Storey, Erwin, all of Tenn.

[73] Assignee: Nuclear Fuel Services, Inc., Erwin, Tenn.

[21] Appl. No.: 807,110

[22] Filed: Dec. 13, 1991

[51] Int. Cl.⁶ .............................. G01T 1/02; G01T 7/04
[52] U.S. Cl. ...................... 250/435; 250/304; 250/336.1; 250/432 R
[58] Field of Search .................................... 250/328, 271, 250/432 R, 435, 304, 370.07, 336.1, 337

[56] References Cited

U.S. PATENT DOCUMENTS

| | | | |
|---|---|---|---|
| 3,348,044 | 10/1967 | Sanders | 250/435 |
| 4,591,720 | 5/1986 | Fuji et al. | 250/362 |
| 4,820,925 | 4/1989 | Balmer et al. | 250/379 |
| 5,099,127 | 3/1992 | Kitaguchi et al. | 250/336.1 |
| 5,179,281 | 1/1993 | Tawil et al. | 250/337 |

FOREIGN PATENT DOCUMENTS

| | | | |
|---|---|---|---|
| 10895 | 1/1984 | Japan | 250/336.1 |
| 2163250 | 2/1986 | United Kingdom | 250/328 |

*Primary Examiner*—Carolyn E. Fields

[57] ABSTRACT

A system for the collection and use of radiation data on airborne particulate materials, which system provides one or more facets of enhanced data accuracy, security, retrievability, accountability of personnel, chain of custody, or the like, the system having the following components:

(a) an airborne material collection filter means having bar code indicia thereon;

(b) a computer adapted for storing and/or processing record data and property data;

(c) a bar code reader adapted for interfacing with the bar code on the filter means and accessing record data thereon, the reader also being adapted for interfacing with the computer for the transport of record data thereto; and (d) a radiation counter adapted for analyzing and providing radioactivity (property data) on particulate materials collected by the filter means and for interfacing with the computer for the transport of the property data thereto;

(e) the computer being adapted for correlating the record data and property data and calculating and reporting work radiation exposure, and/or forwarding the same to storage or further data processing facilities.

16 Claims, 8 Drawing Sheets

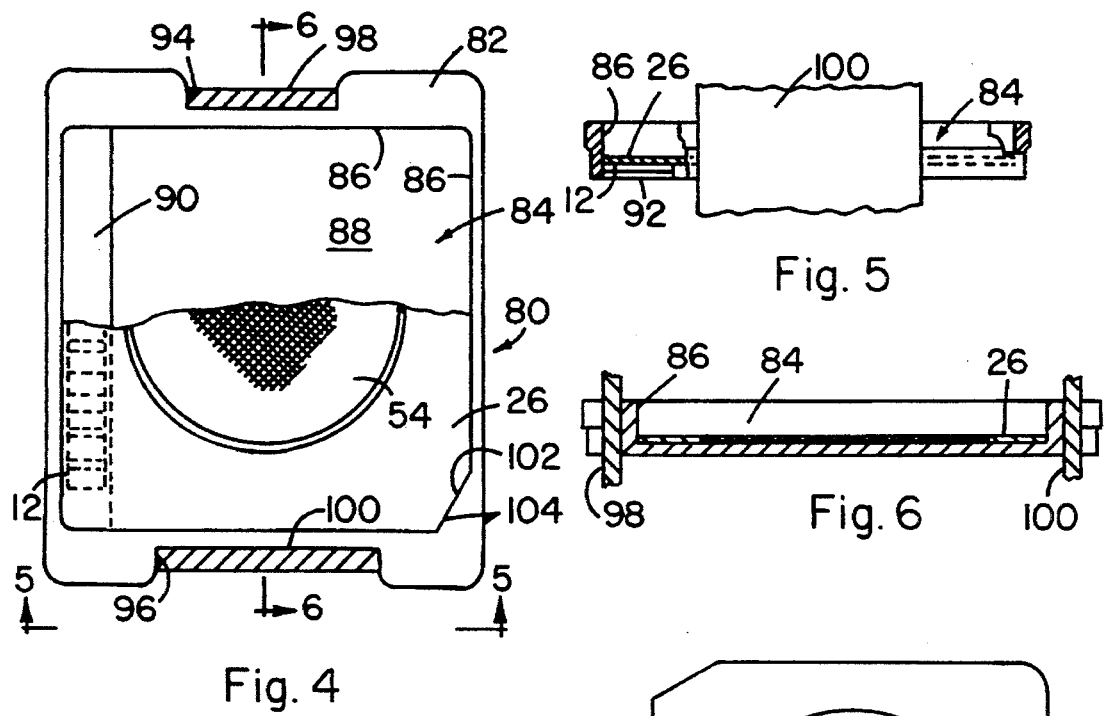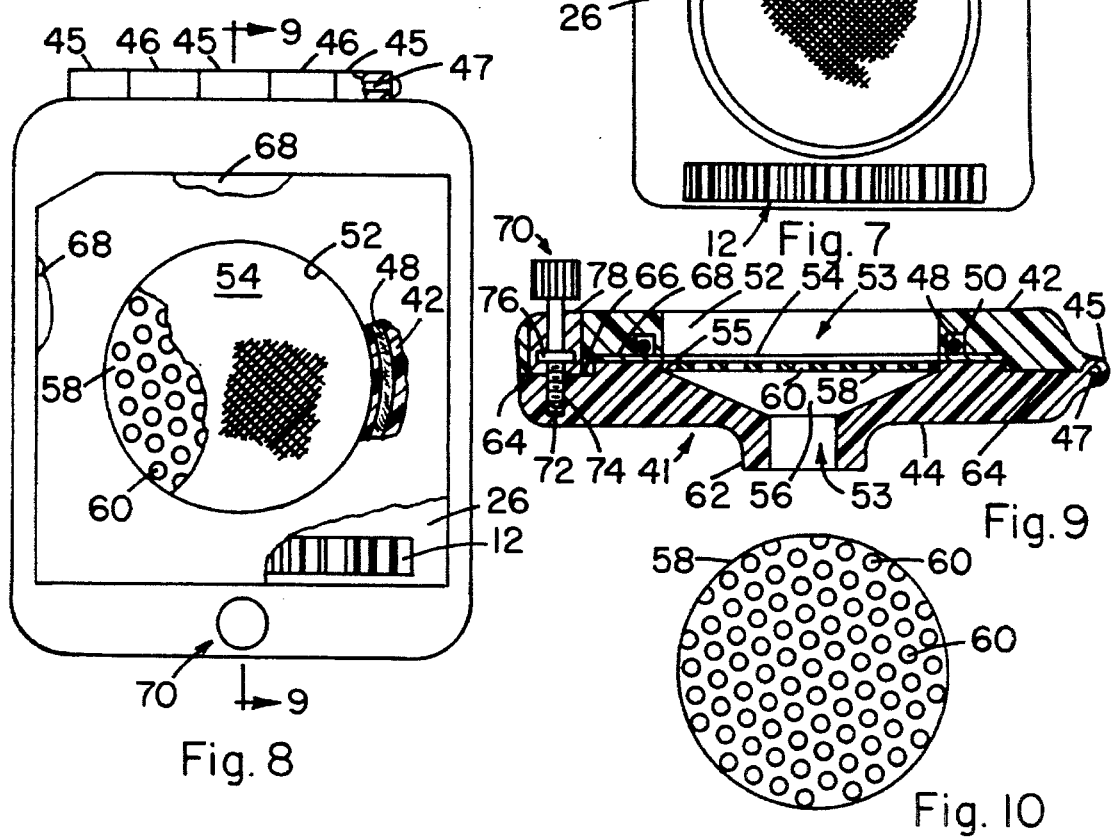

AIR QUALITY MONITORING SYSTEM AND PROCESS

BACKGROUND OF THE INVENTION

This invention concerns an improved system for the monitoring of air quality, particularly in the workplace, whether the workplace consists of one or more rooms or buildings, or even one or more plant sites, via the collection and use of data on airborne materials, particularly radioactive particulate materials such as dust or combustion emitted particles, typically referred to as aerosols, the system providing one or more facets of enhanced data accuracy, security, retrievability, and accountability of operating personnel through recorded chain of custody, or the like.

In industry, in particular, a great deal of effort is presently being directed to providing a working environment which is medically safe for employees. This effort is not limited to work areas subject to ambient (airborne) radioactivity, but encompasses ambient chemical contamination as well, including vaporous, gaseous and colloidal or other particulate chemical contaminants.

Especially troublesome to the monitoring of such contamination are the mechanics of ambient sampling, sample analysis and analytical data processing, particularly where many employees, workplaces and ambient samplings are involved. for example, where the monitoring system which is designed to provide reliable workplace data on individual employees in a readily available and prompt manner, involves 200 employees, 150 workplaces and three shifts per day, the ambient monitoring over a 24 hour period easily involves 12,000–20,000 or more workplace air sampling initiations and terminations. The occurrences therefore, of inadvertent sample mix-ups alone, not to mention intentional but misguided sample takings or handlings, or other error possibly introduced by the detection and counting equipment itself, is quite high.

DISCUSSION OF PRIOR ART

Heretofore, many air sampling devices for airborne materials, particularly for radioactive particulates, have been described, including those shown in the following U.S. Pat. Nos., the disclosures of which for structure and utility are incorporated herein by reference; 4,988,876; 4,820,925; 4,092,539; 4,700,067; 4,415,237; 4,489,315; 4,480,311; 4,342,913; 4,336,532; 4,320,393; 4,301,367; 4,286,155; 3,878,496; and 3,614,442. The efficacy of such devices for their particular intended use is not questioned here, however, insofar as meeting the requirements of an overall monitoring system involving vast numbers of samples is concerned, the prior devices, at best, represent only a potential component of the overall system.

Principal objects therefore, of the present invention are:

- to generate information regarding airborne radioactivity within the workplace, e.g., via rate of deposition of radioactive particulates, and their emission levels, on filters to insure worker safety, health, and compliance with NRC, EPA, OSHA or the like regulations, DOE orders, court-dictated safety requirements and the like;
- to improve personal history accuracy in regard to radiation exposure i.e., air sampling representative of exactly what the worker actually breathed in or is actually breathing in;
- to determine the long range accuracy of stationary, workplace samplers with respect to abnormal occurrences of radiation emission;
- to obtain airborne radiation data for subsequent total exposure (external and internal) determination;
- to minimize errors in data collection and facilitate the prevention of deviation by workers from regular procedures for data collection and subsequent data processing;
- to improve software and computer security by preventing unauthorized access to data, and honest error while also providing audit trail of data handling and filter collection and analysis, e.g. accountability of personnel involved;
- to enhance the capacity of the system for handling large numbers of samples which allows an almost infinitely detailed and continuous monitoring program;
- to shorten the period between sampling and analysis reporting such that corrective measures can be taken promptly where necessary;
- to improve the capacity of the monitoring system to utilize any of a variety of radiation counters;
- to provide the above system in a form which is operative also for monitoring airborne chemicals, e.g., ketones, aldehydes, sulfides and the like;
- to provide such a system which can interface readily with remote data reception sites, e.g., for archiving, further analysis, Government required reports, and the like;
- to provide such a system with uniquely constructed filter card carriers which are bar coded and readable in-situ in magazines of automatic radiation detection and counting or the like analytical apparatus;
- to provide such a system with uniquely constructed sample holders which function well with a variety of stationary and portable particle collection means of high volume, low volume, grab sampling, lapel sampling, continuous air monitoring, or the like capacities; and
- to provide such a system adaptable to monitoring locations which are either inaccessible or impractical to the use of continuous type monitoring systems.

BRIEF SUMMARY OF THE INVENTION

These and other objects hereinafter becoming apparent have been attained in accordance with the present invention which, in its broad physical embodiment is generally defined as a system, hereinafter "AIR QUALITY™" system, for the collection and use of data on airborne materials to generate a radiation exposure profile for each of a number of workers, said system providing one or more facets of enhanced data accuracy, security, retrievability, and accountability of personnel, chain of custody, or the like, for achieving worker radiation exposure-ALARA (as low as reasonably achievable), and with reference to the accompanying drawings comprising:

(a) airborne material collection or sampling means (10) having indicia means (12) thereon;

(b) computer means (14) for storing and/or processing data, hereinafter referred to, but not limited to personal computers—PC;

(c) retrieval means (16) for interfacing with said indicia means and said computer means for accessing and storing record data in accordance with said indicia means, said retrieval means also being adapted for transporting said record data to said computer means;

(d) analysis means (18) for providing property data on materials deposited on said sampling means; and (e) linkage means (20) for transporting said property data to said computer means;

(f) said computer means (14) being adapted for correlating said record data and said property data and calculating alpha/beta ($\alpha$, $\beta$) radiation exposure and reporting (22) and/or forwarding on to data storage or further processing facilities (24) a radiation exposure profile for each particular worker.

It is noted that the radiation designation "$\beta$" actually includes gamma, since the overlapping energy levels of each type of radiation can influence the detector.

In certain preferred embodiments:

a) the collection means comprises holder means adapted to contain filter means having bar code label means thereon containing record data, and wherein said retrieval means comprises bar code reading means;

b) the holder means is also provided with bar code label means;

c) the analysis means is adapted to receive said filter means and is provided with bar code reading means for recording record data from said label means on said filter means, said analysis means further being adapted for the transport of said record data to said computer means;

d) the carrier means is provided for said filter means, said carrier means having window means therein adapted for registration with said label means on said filter means for providing access thereto by said reading means;

e) the said filter means comprises a card having aperture means therethrough, filter element means affixed to said card and substantially covering said aperture means, and said label means being affixed to said card in a position removed from said filter element means; and f) the said analysis means is provided with a loading magazine adapted to hold a plurality of carrier means in a substantially vertically oriented stack, and wherein each said carrier means and said magazine are provided with cooperating locator means for aligning said window means with said reading means.

In its operational embodiment, the invention is broadly defined as the method for obtaining reliable and accurate radiation exposure data for a worker who typically enters and exits at least one workplace one or more times during his workshift, said method comprising:

1) taking at least one airborne particulate sample within each workplace with air pressure differential operated sampling means, and incident thereto, computer recording the following record data;
   (a) sample identity,
   (b) worker identity,
   (c) time of each entry and exit of the worker at each workplace;
   (d) time of each sampling initiation and termination, and
   (e) air flow rate through each sampling means;

2) placing each sample in radiation analyzer means which records the sample identity as record data;

3) operating said analyzer means to generate $\alpha$ and $\beta$, radiation property data for each sample;

4) transporting the data from 2) and 3) to said computer means; and 5) correlating all of the above data within said computer means and providing a radiation exposure profile for the worker.

In a highly preferred embodiment of the above recitation of the method aspect of the invention, the record data is obtained by bar code reader means from bar code label means associated with each sample, and the record and property data are transported by the reader means to computer means having the capacity for calculating from the property data, sampling period, and air flow rate, an $\alpha$, $\beta$ radiation exposure profile for the worker.

The simplicity, speed, reliability and efficiency of the present invention is evident from a comparison of the embodiment of the present invention diagrammed in FIG. 11 with the typical prior art process diagrammed in FIG. 12, particularly with regard to the automatic computerized steps of FIG. 11 versus the several manual steps of FIG. 12.

BRIEF DESCRIPTION OF THE DRAWINGS

The invention will be further understood from the following description and drawings wherein:

FIG. 4 is a top elevational view of a filter card carrier showing a portion of a filter card therein and being specially adapted for use with a TENNELEC radiation counter;

FIG. 5 is a partially sectioned end view of the carrier of FIG. 4 taken in the direction of arrow 5.

FIG. 6 is a cross-sectional view taken along line 6—6 in FIG. 4;

FIG. 7 is an elevational view of the bar coded side of a filter card;

FIG. 8 is a front elevation, with portions broken away, of a pressure differential operated, e.g., suction operated filter card holder with a filter card in place therein;

FIG. 9 is a cross-sectional view taken along line 9—9 of FIG. 8; and

FIG. 10 is a front elevational view of a filter backing plate used to maintain the filter in a flat posture.

With reference to the above summary of the present invention and the drawings, the collection means 10 comprises a filter, e.g., filter paper either used by itself or preferably affixed in any manner to a card 26 of strong paper or plastic for ease of handling, the card or the filter itself also having the indicia means 12 such as a bar code affixed thereto. The system is primarily designed to monitor the radiation ($\alpha,\beta$) emitted by airborne particles in the workplace, and for this use a Whatman, Gelman, or equivalent brand filter is preferred. The filter should be of adequate size to give a fair sampling. The filter should be constructed to allow an air flow of from about 0.5 to about 5.0 ft.$^3$/min. at a suction differential pressure of from about 640 mmHg., for a filter surface area of from about 20 mm² to about 300 mm². The two types of preferable filters are Whatman 41 ashless, 47 mm., and Gelman type A/E glass fiber filter, 47 mm. An exemplary paper is card stock, maximum thickness 0.010 inch, and minimum thickness 0.008.

As alternative useful indicia means there may be mentioned attachable microchip data storage devices, holograms, chemical signatures, "invisible" bar codes, electronic transmission (radiowaves, microwaves), automatic sensors, chemical heat signatures, sonic signatures, raised characters in the manner of braille, fiber pattern recognition, magnetic strip signature, light emitting diode technology and punched hole recognition or the like. The methods for using such indicia are well known to the art.

Figure 1:
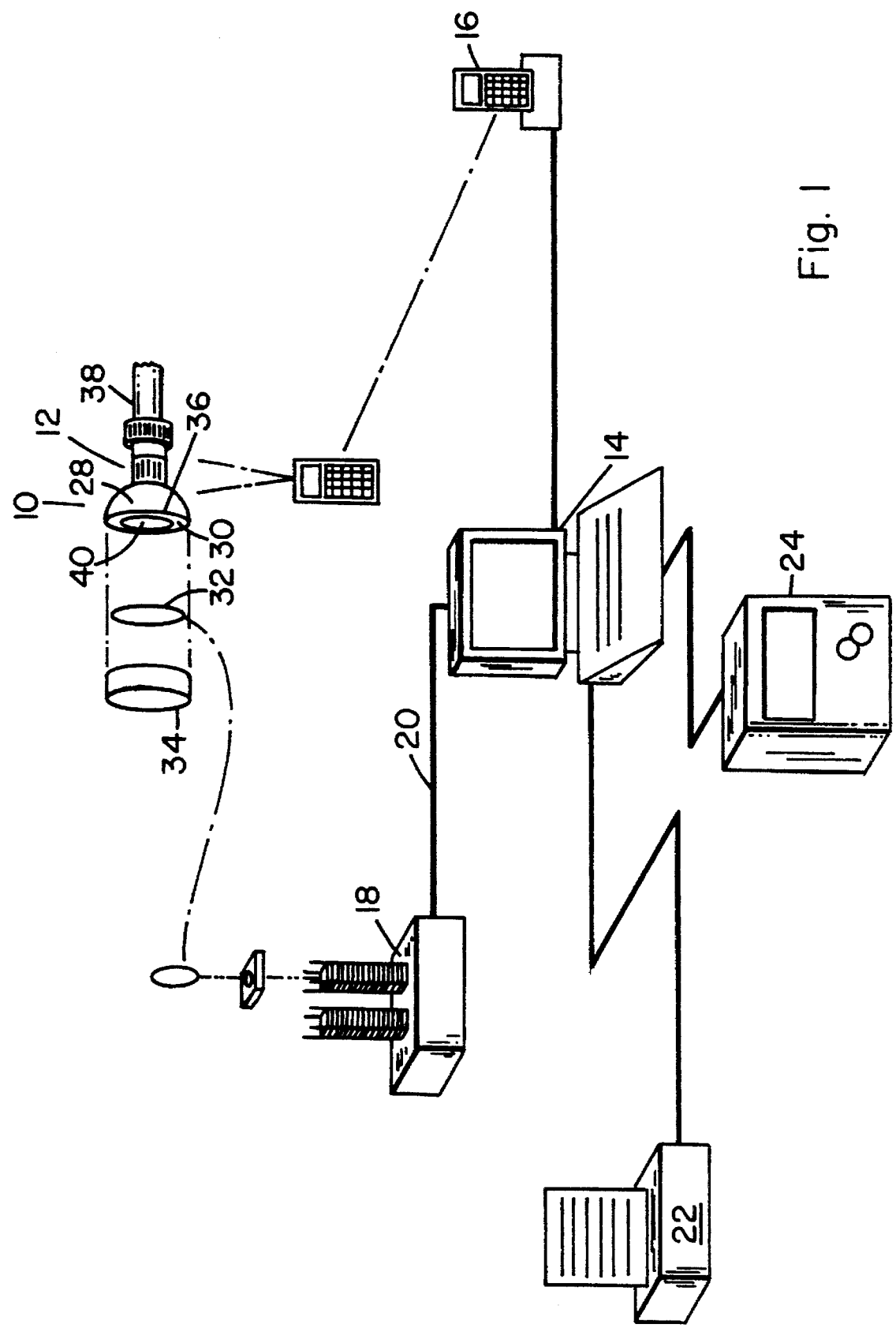
FIG. 1 is a schematic of one embodiment of the present overall monitoring system.
Figure 2:
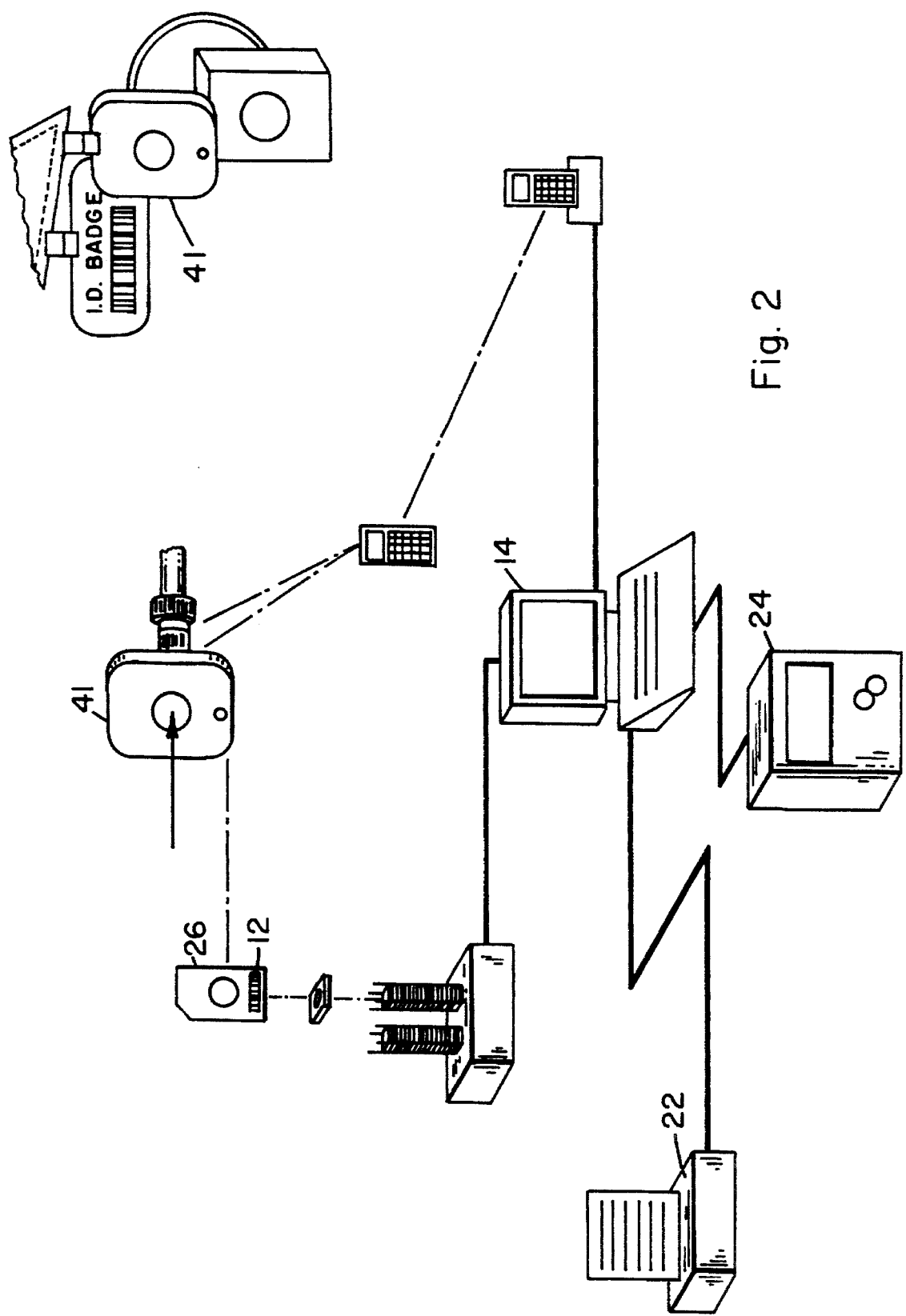
FIG. 2 is a schematic of an alternative embodiment of the system.
Figure 3:
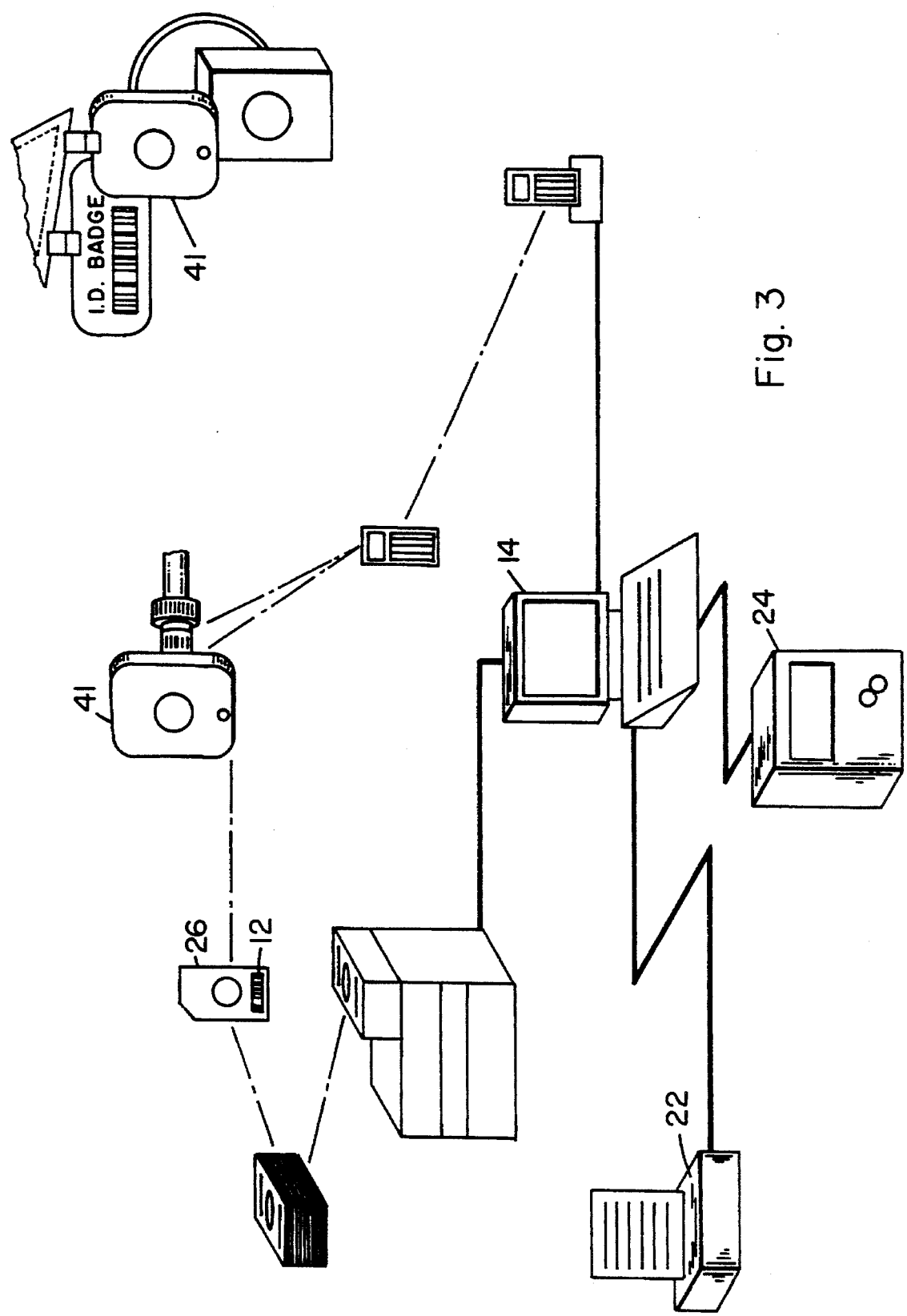
FIG. 3 is a schematic of another embodiment of the system.
Figure 11:
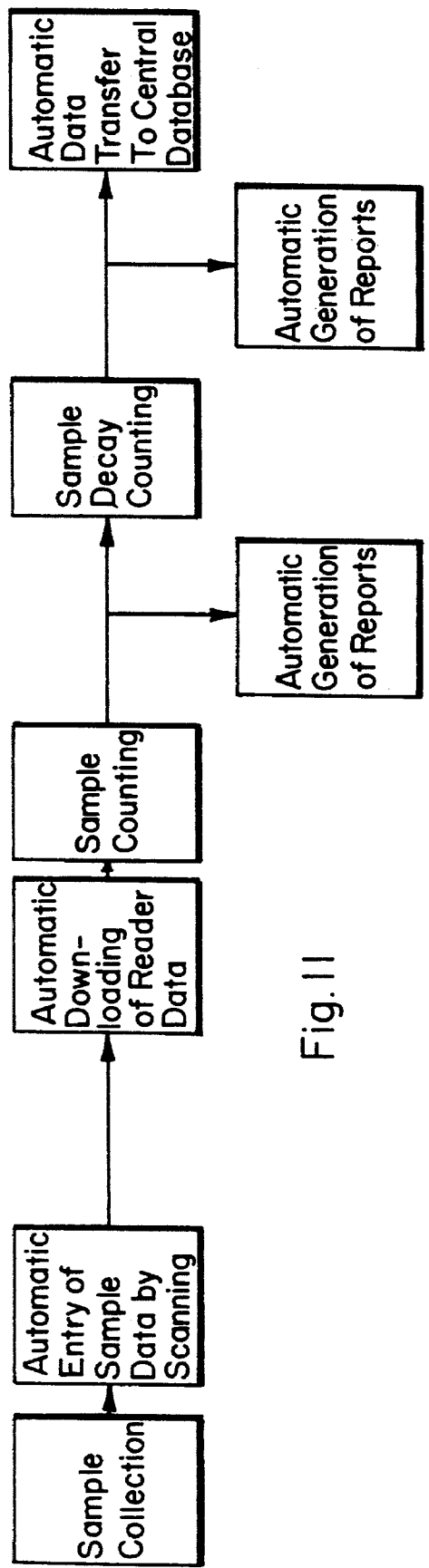
FIG. 11 is a flow diagram of the present "air Quality" air sampling data collection process.
Figure 12:
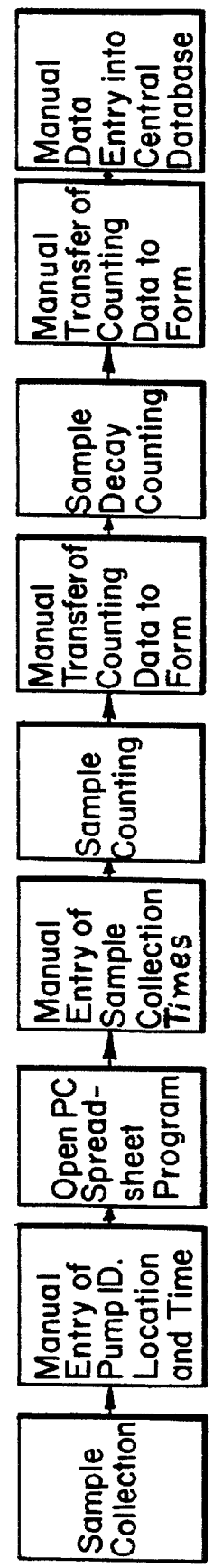
FIG. 12 is a flow diagram of a typical manual air sampling data collection process.

The means for handling the sampling filters can be greatly varied as shown in several of the aforementioned patents and includes any of a variety of available open face filter heads such as, e.g., the assemblable type holder shown in FIG. 1, marketed as a Gelman Sciences, Inc. Model 1220 open face filter head, as well as the present innovative compact type holder of FIGS. 8–10, the latter being greatly preferred for convenience of operation, in-situ identification, and adaptation to available radiation counting devices as will be described hereinafter in further detail.

The Gelman Sciences, Inc., sample holder, as well as many other open face filter heads, basically comprises a body 28 having an annular face 30 against which the perimeter of a self supporting filter 32 is tightly held by a cap 34 which is screwed on over the outer rim 36 of body 28. A vacuum line 38 is connected to body 28 and communicates with the bore 40 thereof to allow air to be drawn through the filter by any convenient low pressure source connected to line 38. The means for governing air flow through the sampling filters can be greatly varied. A Dwyer Instruments Inc. Flow Meter, Catalog No. VFA 26 SSV, is preferred for convenience of operation.

The present system may also be used for monitoring airborne chemicals, particulate materials, vapors or the like, employing known deposition or contact substrates therefor. In this regard, chemical analysis devices which detect qualitatively and quantitatively and report results electronically are available for a wide variety of inorganic and organic particulates and vapors or gases and can be used in place of the radiation counter shown in the drawings. Likewise, for such vapors or gases, collection chamber devices or chemically reactive substrates can be employed in known manner in place of the radioactive particulates filter for generating the necessary chemical property data.

The various components of the present system and preferred processes which they carry out are exemplified in the drawings and are designated for convenience in the description as Systems 1 through 4, the differences therebetween being apparent from the drawings and detailed explanation thereof which follows. Actual use procedures for these systems for monitoring, analyzing and reporting airborne radioactivity levels which are highly representative of worker inhalation, are described below, the recited order and precise timing of the steps of each procedure being exemplary only.

System 1 (Predetermined Stationary Filter Location)

1) At the beginning of each work activity, an air filter for particulate materials is loaded into a holder which is provided with a bar code label. The holder is selectively located within a work station area to provide a highly representative sampling of actual worker air-inhalation.

2) After loading the filter, a programmed bar code reader is used to scan the holder label and record the holder workstation location therefrom along with the time and date of scanning. The holder is then immediately actuated by placing in communication with a vacuum system via an in-line flow meter which controls and monitors the air flow rate through the filter.

3) Steps 1) and 2) are repeated for all such workplace air sampling locations.

4) At the end of a prescribed period, each filter is removed from its holder (vacuum broken) and placed in an envelope which bears a bar code label identifying the particular sample carrier by number into which the filter is to be placed for counting. Immediately thereafter, the reader scans both the label on the holder and the label on the envelope and records and correlates the data therefrom along with the time and date of scanning.

5) The reader then transports the above data, hereinafter termed "record data", to a programmed PC.

6) At the time of loading the counter magazine, the reader scans the envelope label and gives a visual display of the identifying number of the carrier into which the filter is to be loaded. The carriers are then loaded and placed in numerical order in the magazine, and the counter placed in operation.

7) After the counter has completed radioactivity (property data) analysis of each filter, the PC imports the data as assigned to each carrier identification.

8) The PC then correlates the record data and property data, and performs personnel exposure analysis thereof, and, if desired, prints reports of this analysis. In this regard, the data can also, or in the alternative, be exported to a centralized database for further analysis, further correlation with other data such as the worker's medical status and history, and/or data storage.

System 2 (Predetermined Stationary Filter Location)

1) At the beginning of each work activity, a card having an air filter for particulate materials affixed thereto, and bearing a bar code label, is scanned by a programmed bar code reader which records the card identification. The card is then loaded into a holder which is selectively located within a work station area to provide a highly representative sampling of actual worker air-inhalation.

2) After loading the filter, the reader scans a bar code label attached to the holder and records its work station location along with the time and date of scanning. The holder is then immediately actuated by placing in communication with a vacuum system via an in-line flow meter which controls and monitors the air flow rate through the filter.

3) Steps 1) and 2) are repeated for all such work station air sampling locations.

4) At the end of a prescribed period, each card is removed from its holder (vacuum broken) and the labels on the card and holder immediately scanned by the reader which records the time and date of scanning and correlates the same with the holder location, card identification, time and date of sampling initiation and termination, and any other relevant record data stored in the reader.

5) The reader then transports the record data to a PC.

6) Each card is subsequently loaded into a sample carrier having a bar code viewing window, and the carriers then loaded into a radiation counter magazine. The counter is in communication with the PC for transport of property data thereto and is provided with an internal bar code reader which records the record data from the card label.

7) After the counter has completed radioactivity (property data) analysis of each filter, the PC imports the data as assigned to each card identification.

8) The PC then correlates the record data and property data, and performs personnel exposure analysis thereof, and, if desired, prints reports of this analysis. In this regard, the data can also, or in the alternative, be exported to a centralized database for further analysis, further correlation with other record data such as the worker's medical status and history, and/or data storage.

System 3 (Lapel Air Sampling)

1) At the beginning of each work activity, a card having an air filter for particulate materials affixed thereto, and bearing a bar code label, is scanned by a programmed bar code reader which records the card identification. The card is then loaded into a holder which is then affixed to the worker's clothing, e.g., lapel, near his breathing zone to provide a highly representative sampling of the worker's actual air-inhalation.

2) The reader then scans a bar code label worn by the worker and records the worker identification along with the time and date of scanning. The holder is then immediately actuated by placing in communication with a vacuum system, also preferably worn by the worker, via an in-line flow meter which controls and monitors the air flow rate through the filter.

3) Steps 1) and 2) are repeated for all such workers.

4) At the end of a prescribed period, each card is removed from its holder (vacuum broken) and the labels on the card and the workers identification immediately scanned by the reader which records the time and date of scanning and correlates the same with the card and worker identification, time and date of sampling initiation and termination, and any other relevant record data stored in the reader.

5) The reader then transports the record data to a PC.

6) Each card is subsequently loaded into a sample carrier having a bar code viewing window, and the carriers then loaded into a radiation counter magazine. The counter is in communication with the PC for transport of property data thereto and is provided with an internal bar code reader which records the record data from the card label.

7) After the counter has completed radioactivity (property data) analysis of each filter, the PC imports the data as assigned to each card identification.

8) The PC then correlates the record data and property data, and performs personnel exposure analysis thereof, and, if desired, prints reports of this analysis. In this regard, the data can also, or in the alternative, be exported to a centralized database for further analysis, further correlation with other record data such as the worker's medical status and history, and/or data storage.

System 4 (TOTAL EXPOSURE™ Monitoring)

The purpose of this system is to gather data which reflects the amount of total exposure that an individual has received from radiation in the workplace.

1) The system combines the air concentration data collected in System 1 and 2 above with an individual's time in the workplace to form an estimated daily air exposure for each person entering the facility. This exposure is combined with various in vitro and in vivo measurements to form an internal exposure record for an individual. The in vitro measurements comprise, e.g., instantaneous urine, incremental fecal and incremental urine samples. The term "incremental" means that the sample count gives total count received over a period of time, e.g., a sample taken once a month gives a count which is then extrapolated to give an equivalent one month exposure. The in vivo measurements comprise, e.g., the detection and energy level values of $\gamma$ rays emitted from particulate material residing in specific portions of the body such as lungs, the measurements being made by ultra-sensitive $\gamma$ detection equipment with sensors positioned, e.g., on the chest of the individual. The term "routine" means that the lapel sampling procedure was carried out in the normal course of daily activity, rather than carried out, e.g., for a special purpose over a specially prescribed period and in a special workplace. These samples, along with a routine lapel sampling system, certifies the individual's air exposure.

2) After the internal exposure is determined, the system combines the internal exposure with the external exposure determined by the dosimetry program of the facility to form an individual's whole body dose equivalent to radiation in the workplace.

3) This record is then permanently maintained for each individual. The exposure results are annually transmitted to the regulating organization for review.

For regular shift workers, the bar code on workstation permanently installed air sampling means automatically provides the reader or PC or main frame with the identity of the worker who is scheduled to work there during a given period. For example, this identity of workers on regular shifts can be prior recorded in the PC, reader or main frame for correlating with other record data obtained from the reader and property data when exposure analysis, reporting or the like for an individual is requested.

In a highly preferred embodiment of the present invention, the filter means air sampler card holder 41 as shown in detail in FIGS. 8–10 is employed. This holder of, e.g., plastic such as polyamide, butyrate or the like, or metal or ceramic, is in the form of a compact comprising front half 42 and back half 44 hinged by segments 46 and 45 provided respectively thereon and which are pivotally connected by pin 47 for opening the halves to access a sample filter card such as 26. Resilient compressible gasket means such as O-ring 48 or the like is preferably affixed to front half 42 within annular groove 50 encircling the air inlet port 52 of passage 53 therein to compress against card 26 to seal the filter media or element 54 thereof completely around the suction chamber 56 provided in back half 44. It is noted that filter element 54 preferably does not overlap the card and is held thereto by a thin, annular, flat, clear adhesive strip 55. A backing plate 58 having a plurality of apertures 60 therethrough is preferably provided to support the filter portion 54 in a flat posture. This backing plate is adapted to frictionally fit within passage 53 and rest on annular shoulder 55 formed on the wall which forms passage 53. The suction neck portion 62 of back half 44 is readily adaptable for fitting over or into the inlet of any convenient low pressure source or conduit thereof to provide adequate suction velocity to the air entering through port 52. This neck portion may be internally or externally threaded and provided with suitable coupling means, including quick disconnect coupling means, for rapid connection and disconnection to the reduced pressure source. It is noted that a small gap is preferably provided between the adjacent surfaces 64 and 66 of the halves to allow proper sealing of card 26 between O-ring 48 and raised surface 68 of the back half. Any suitable latching mechanism may be used to releaseably secure the halves tightly together, such as screw fastener means 70 which comprises threaded aperture 72 in the back half and mating screw 74 rotatably but permanently mounted in the front half. This screw, in the exemplary embodiment shown, is provided with a shoulder 76 rotatable within a bearing member 78 imbedded in the molded half 42.

The computer means useful in accordance with the present invention for storing and/or processing data is exemplified by the IBM PS/2 indicated in the drawings. This computer is preferably adapted to employ a custom based software program for an IBM-compatible personal computer which will perform the following functions: interface with the bar code readers; interface with the Tennelec LB5100 alpha/beta counter; maintain air sample station data to link sampler identification with location; merge bar code reader data with Tennelec data; process merged data and produce initial and decay concentration reports; and export air sample data to the site's centralized database if desired. An exemplary such computer is the 386, 25 Mhz IBM compatible PC with 4MB RAM, 2 serial and 1 parallel port, VGA card, VGA color monitor, and an 80 MB hard drive computer.

The CPU of the computer can be configured with an Intel 32 bit microprocessor, model 80286, 80386, 80486, or the like operating on a 16 bit internal bus. 640,000 Bytes of core Random Access Memory (RAM) is preferred, operating at a read/write cycle time of at least about 120 nanoseconds. A peripheral on-line random access storage unit is desirable which consists of a high-speed 20 megabyte disc drive with fast access time of, e.g., 160 milliseconds maximum total and 86 milliseconds average. This peripheral will provide on-line storage for the operating system and all software programs needed for operation and testing. A 1.2 or 1.44 megabyte diskette drive is preferred for transfering operating system and application programs to the on-line random access storage unit.

A video graphics array (VGA) color or monochrome analog monitor is desirable for operation. The monitor is attached to the CPU bus via a 16-bit VGA adapter card. An RS-232 standard serial communication adapter attached to the CPU bus is preferred for communicating with bar code reader means. A Centronics parallel communication adapter attached to the CPU bus is used to communicate with the printer.

The exact programs to implement the invention, where one or more programmable computers are used, varies with the computers, data base organization, programming language and like factors chosen for the implementation. Programs which implement the above airQUALITY data flow and logic are preferred. Any such computer having equivalent command and memory capacity and program versatility may be employed however.

Useful data retrieval means such as bar code or other indicia readers, scanners or the like having transmission facility for data importation to the computer means include the INTERMEC models, particularly the 9440, these devices being shown and described in the INTERMEC sales Catalog (55 pages), dated Dec. 5, 1990, of INTERMEC, 178 Northwestern Ave., Oak Ridge, Tenn. 37830. Further details of such useful bar code devices and technology is found in U.S. Pat. Nos. 4,794,239 and 4,432,830, the disclosure of which are incorporated herein by reference. Also, other devices such as and the SYMBOL model LDT 3805 shown and described in the 3/91 brochure of Symbol Technologies, Inc. 116 Wilbur Place, Bohemia, N.Y. 11716, entitled "LDT 3805 Laser Data Terminal" may be employed. The term "record data" as used herein and for which the above retrieval means is employed includes, for example, in addition to currently obtained data, background information on the employee who is wearing the air sampler to be processed or who is working at the particular workstation where the stationary air sampler to be processed is positioned. This background information can include a complete work history of the worker in regard to his previous work assignments and workplaces, duration in each workplace, radiation exposure in each workplace, any of his special medical or other circumstances which might bear on his ability or need to function in such a workplace, or the like which would be useful in monitoring his radiation exposure status.

The analysis means for providing property data on airborne materials collected on the filter means can be done by any suitable $\alpha$, $\beta$ detector and counting device, but preferably by the TENNELEC system which utilizes an automatic sample changer that allows the user to load samples in carriers for automatic positioning therein for analysis. The instrument will automatically transfer the sample to the counting chamber for analysis and count the samples radiation output for a period of time which is determined by the user. A variety of such devices are available, their selection depending upon the type of analysis required.

The preferred counting system employs the present software which particularly enhances the Tennelec LB5100 alpha/beta counting equipment. Therefore, a Model LB5100 Tennelec alpha-beta counter with 3.05 firmware, 1.66 or greater operating software, and a floppy disk drive is most desirable. Additional hardware including the above identified PC allows the present software program to integrate with the Tennelec LB5100. This hardware preferably comprises the following: Intermec 9440 Bar Code Reader with 128K RAM, case,and battery; Intermec wand scanner (1 for backup); Intermec docking module; Intermec power supply; Intermec PC interconnecting cable; Intermec battery charger/discharger; Intermec backup battery pack for Intermec 9440 bar code reader; and Hewlett Packard LaserJet IIIP printer with cable.

Further details of the construction and operation of the Tennelec counter are given in the sales brochure (15 pages) entitled "LB5100 Series III, LB5100 Series III-PC" of the TENNELEC company of 601 Oak Ridge Turnpike, Oak Ridge, Tenn. and in the sales brochure (4 pages) entitled "TENNELEC APC Series II Automatic Planchet Counting System"—APC SERIES II 5.0K 290'—TENNELEC/ NUCLEUS, Inc., of the same address.

The count data may be stored on a diskette or the like for transfer to another system, or may be directly transferred to the computer via a communication port. This raw data may be used in conjunction with a software package to produce a variety of analytical reports. The TENNELEC system communication interface methods allow the connection of the Tennelec system to a personal computer (PC) using industry standard techniques. Interface protocols supported by the Tennelec system include RS-232, IEEE 488, and direct diskette file access.

The present AIR QUALITY system employs state-of-the-art bar coding techniques for data collection, and utilizes preferably Intermec 9440 bar code readers. The present software simplifies the air sample collection process by enabling the operator to use the bar code reader as a guide for data entry. The software utilizes on-line, menu driven screens which prompt the user to key in important information concerning the various transactions. This data is immediately stored on systems files for instant data retrieval by the user. The software produces a file which is periodically transferred to the mainframe computer system. Using the Export Decay Concentration Data transaction, the User is prompted to download valuable decay analysis data to floppy disk in "Drive A". The data is then uploaded to mainframe files using existing programs. This program further integrates with and is one of the core modules of a "TOTAL EXPOSURE™" program which is a comprehensive system for tracking and reporting personnel exposure, both internal and external. It tracks personnel movement throughout a site, correlating existing environmental conditions, and also collects personnel exposure records, including dosimetry and bioassay information, in order to provide a complete and total exposure record for an individual. Exposure reports are generated automatically by the system to help support regulatory reporting requirements. The system modules include:

Exposure Records & Reporting Module

The Exposure Records Module is designed to collect, analyze, store, and maintain all data required to create and preserve an exposure profile on each employee. The system combines both in vivo and in vitro results to form a comprehensive exposure record for an individual. These results include nasal smears, in vivo whole body counts, urinalysis, fecal analysis, external dosimetry and air exposure. In addition, the module offers a method of tracking each sample requested by a site's Safety Department. Bar coded systems interface with the Exposure Records & Reporting Module to automate data collection.

airQUALITY Module

When used in conjunction with the NFSystem TOTAL EXPOSURE™ program, airQUALITY provides information to the Exposure Records & Reporting Module. This information is used in providing representative workplace air sampling.

Personnel Module

The Personnel Module is comprised of four, integrated sub-modules: Time for Exposure, Training & Qualifications, Manpower Scheduling, and Access. The following is a brief description of each sub-module.

Time for Exposure Sub-Module

Tracks employee movement for air sample correlation, Assists Site Evacuation Personnel Accountability, and Utilizes badge reader technology.

Training and Qualifications Sub-Module

Records employee training and qualifications history; Integrates with the Access and Manpower Scheduling sub-modules; Provides notification of impending training and qualification expirations; and Utilizes badge reader technology.

Manpower Scheduling Sub-Module

Permits employee job assignment scheduling; Integrates with the Access sub-Module; and Prevents scheduling of restricted personnel or personnel lacking proper training and/or qualifications.

Access Sub-Module

Prevents workplace access to restricted personnel or personnel lacking proper training and/or qualifications; Prevents workplace access to exposure-restricted personnel; and Prevents workplace access to personnel with other (non-exposure) work restrictions.

Figure 13:
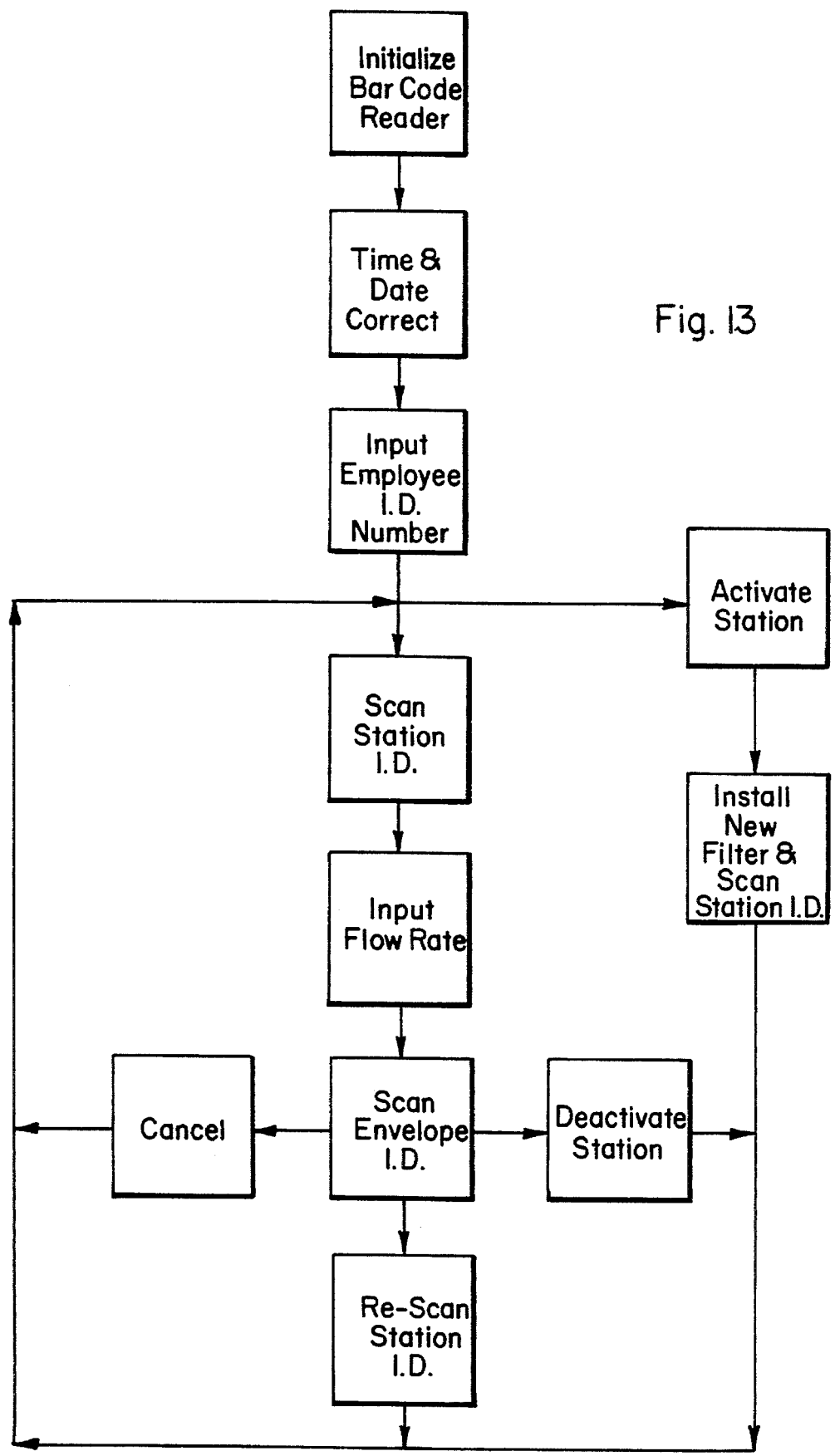
FIG. 13 is an "air Quality" sample collection flow diagram.
Figure 14:
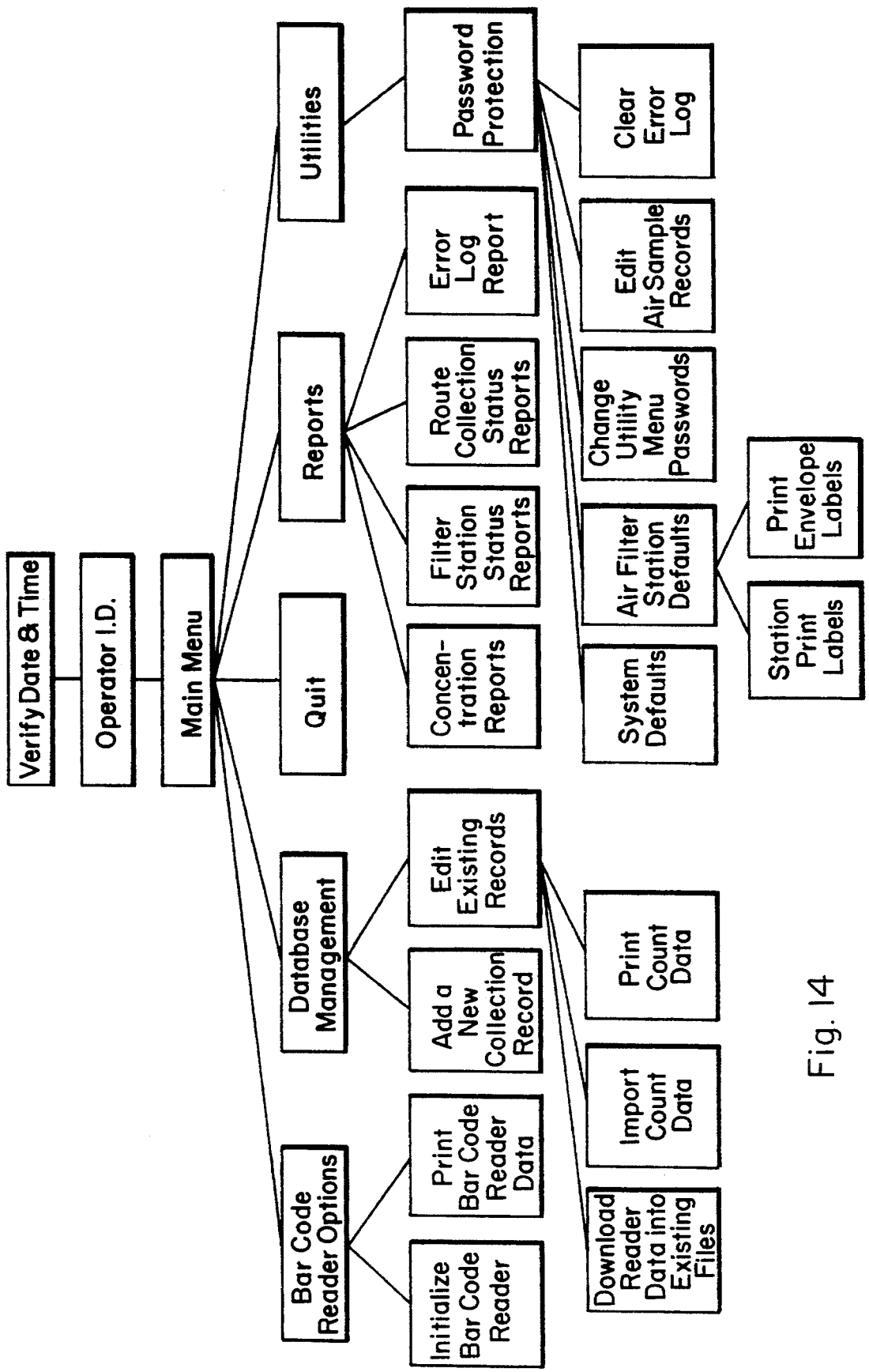
FIG. 14 is a diagram of an "air Quality" menu hierarchy.
Figure 15:
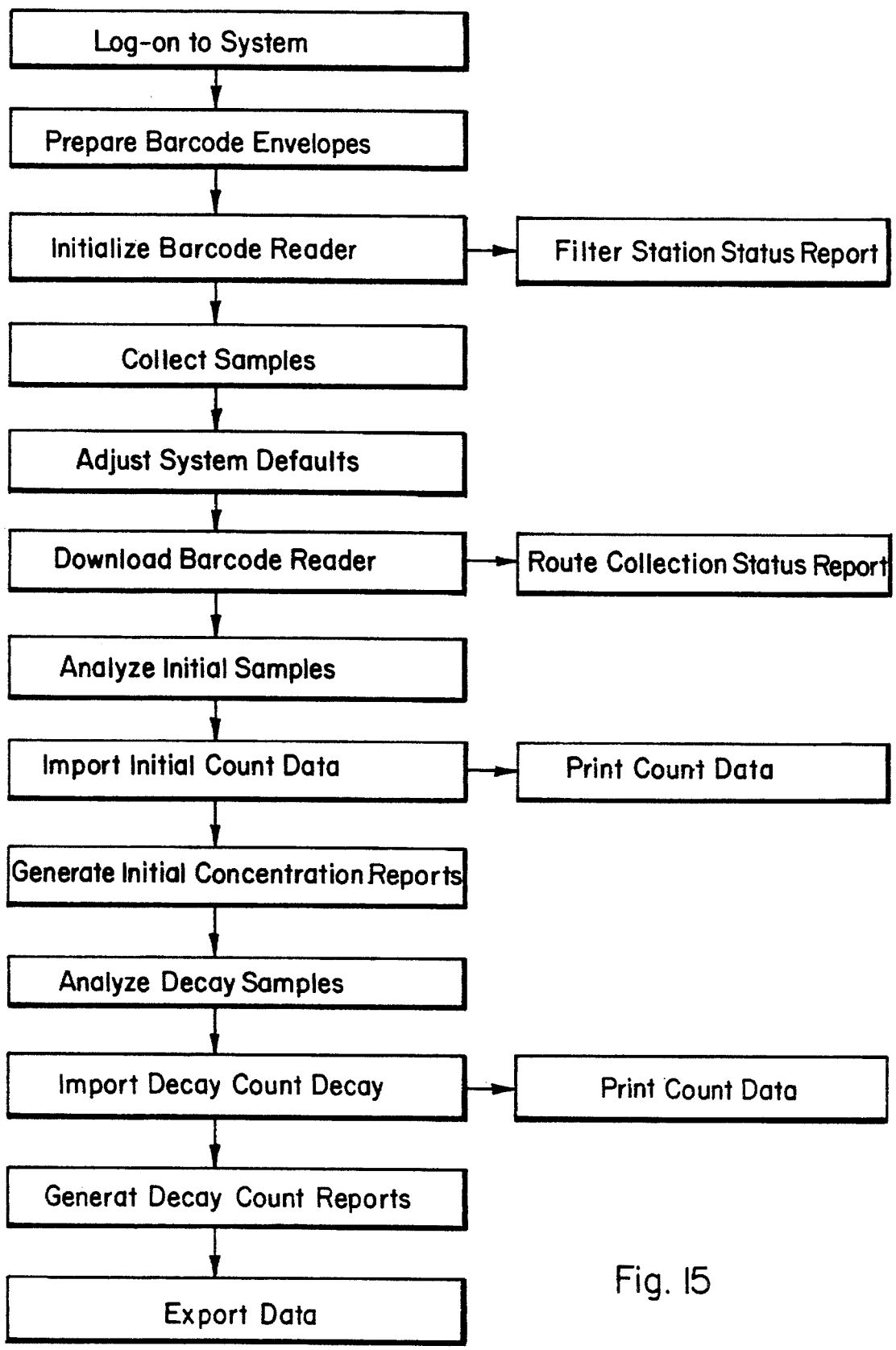
FIG. 15 is an "air Quality" system flow diagram.

It is noted that the present software was developed for carrying out the present monitoring scheme, through the application of conventional programming techniques including the use of standard binary characters, and applicant does not intend to imply criticality in any particular program, but simply one which can carry out the claimed monitoring scheme. This scheme which is designated "air QUALITY", is shown in it's generalized form by the schematics shown in FIGS. 13, 14 and 15, and the software was developed using standard programming techniques which incorporate structured sub-routines and modules. User interface is performed through menus, graphics, and function keys. The program was written in a high-level language and includes extensive documentation.

The following is exemplary of the reports produced by the present system.

| DECAY ALPHA CONCENTRATION REPORT | |
| --- | --- |
| Purpose: | The purpose of this report is to provide the User with a hard copy report showing the alpha concentration levels of each air filter after a seven-day decay. |
| Frequency: | Daily |
| Source: | Air Filter Results File |
| Report Totals: | None |
| Page Breaks: | Every 50 lines |
| Fields: | The fields on the report are described below. |
| Name | Description |
| Station ID | The unique number assigned to a sample which indicates where the sample was taken. |
| Station Location | The description of the physical location of the air filter station. |
| Gross CPM | The gross counts per minute of activity for the decay analysis; i.e., without background correction. |
| Concentration | Activity concentration as derived by the system for the decay analysis. |
| 2 Sigma | The error bar associated with the concentration calculation. |
| MDC | The minimum dectectable concentration that can be detected by the counting device. |
| Avg. Flow Rate | The flow rate of an air sampling station, as averaged over the total sampling period. |
| Install Date | The date the air filter was placed on the air filter station. |
| Install Time | The time the air filter was placed on the air filter station. |
| Collect Date | The date the air filter was collected. |
| Collect Time | The time the air filter was collected. |
| Sample Time | The total sampling period for an air filter station. |

HEALTH PHYSICS LAB REPORT

Background CPM: .2333333
Alpha Efficiency: .2617
Radiation Monitor: 321

Decay Alpha Concentrations

Report Run Date: 09-07-1991
Sample Collection: 09-07-91
Special Run ID: Shift: 1

| Station ID | Station Location/ Description | Gross CPM | Concentration (uCi/ml) | 2 Sigma (uCi/ml) | MDC (uCi/ml) | Average Flow Rate | Install Date | Install Time | Collect Date | Collect Time | Sampl. Time |
|---|---|---|---|---|---|---|---|---|---|---|---|
| MRV-12 | ROVER | 10.00 | <3.97E-12 | | 3.97E-12 | 45.00 | 09-06-91 | 19:28 | 09-07-91 | 19:02 | 1,414 |
| L-7 | 2A-580-19D-1A | 0.00 | <3.97E-12 | | 3.97E-12 | 45.00 | 09-06-91 | 19:29 | 09-07-91 | 19:02 | 1,413 |
| L-13 | 2A-593-14D-1A | 0.00 | <3.97E-12 | | 3.97E-12 | 45.00 | 09-06-91 | 19:29 | 09-07-91 | 19:02 | 1,413 |
| EB-204 | 2A-588-15B-1A | 55,130.00 | * 5.51E-09 * | 1.45E-10 | 3.97E-12 | 45.00 | 09-06-91 | 19:29 | 09-07-91 | 19:03 | 1,414 |
| EB-8 | 2A-580-8D-4A | 0.00 | <3.76E-12 | | 3.76E-12 | 47.50 | 09-06-91 | 19:33 | 09-07-91 | 19:06 | 1,413 |
| EB-23 | 3E-580-8D-4A | 0.00 | <3.76E-12 | | 3.76E-12 | 47.50 | 09-06-91 | 19:32 | 09-07-91 | 19:06 | 1,414 |
| EB-70707 | 2C-580-2B-1A | 0.00 | <3.76E-12 | | 3.76E-12 | 47.50 | 09-06-91 | 19:32 | 09-07-91 | 19:06 | 1,414 |
| EB-12345 | 2D-580-2C-1A | 0.00 | <3.97E-12 | | 3.97E-12 | 45.50 | 09-06-91 | 19:32 | 09-07-91 | 19:06 | 1,414 |
| EB-70001 | 2C-580-3A-9S | 0.00 | <3.74E-12 | | 3.74E-12 | 47.50 | 09-06-91 | 19:35 | 09-07-91 | 19:18 | 1,423 |
| EB-54321 | 2D-580-2C-1A | 0.00 | <3.75E-12 | | 3.75E-12 | 47.50 | 09-06-91 | 19:35 | 09-07-91 | 19:12 | 1,417 |
| AC-10291 | 3B-700-12-1344 | 0.00 | <3.75E-12 | | 3.75E-12 | 47.50 | 09-06-91 | 19:35 | 09-07-91 | 19:12 | 1,417 |
| AC-10101 | 4D-700-12-1245 | 0.00 | <3.76E-12 | | 3.76E-12 | 47.50 | 09-06-91 | 19:36 | 09-07-91 | 19:12 | 1,416 |

The present system typically provides radiation exposure reports which contain data such as distinguished α, β, gross counts/min., radiation levels exceeding prescribed standards, and sampling location which automatically gives worker identification where permanent samplers are used in each work station.

A highly preferred sample carrier for use with the Tennelec System counter is shown in FIGS. 4–6, wherein the carrier 80 comprises a body 82 of plastic, metal, ceramic or any other suitable material, having a recess 84 formed by wall means 86 and floor means 88 into which the filter card 26 can be neatly fitted. Floor 88 is provided with a slot or aperture 90 adjacent one edge to form a viewing window or portal through which a bar code or other indicia on the sample filter card can be read. This window may be covered by a protective transparent element 92 of, plexiglas, a methylacrylate plastic. A pair of peripheral recesses or locator me 94 and 96 of different widths are provided in the carrier body to slide down along keying or locator guides or stachions 98 and 100 of the sample magazine of the Tennelec system shown in the aforesaid Tennelec publications. Complementary shoulders 102 and 104 on the carrier sidewall and filter card respectively insure that the bar code will be in registry with aperture 90.

In a more preferred embodiment of the sample holder 41, a bar code viewing window such as slot 90 of the above described carrier may be provided in either half of the holder, and situated outboard of O-ring 48. Such a feature would eliminate the need, for many situations, for removing the filter card in order to scan the bar code thereon.

This invention has been described in detail with particular reference to preferred embodiments thereof, but it will be understood that variations and modifications will be effected within the spirit and scope of the invention.

I claim:

1. A system for the collection of property data on samples of airborne particulate materials, and of bar coded record data comprising identification of said samples and of each sample collection means and its location, of worker(s) total time exposure periods, and of said worker(s) exposure history, said property data comprising α, β radiation counts, said system providing one or more facets of enhanced property data accuracy, data security, data retrievability, accountability of personnel, chain or data custody, or use of worker record data and being adapted for ultimately attaining active worker minimal radiation exposure, said system comprising:

(a) airborne material collection means adapted for use within a workplace and having bar coded indicia means thereon containing record data for said worker(s) including collection means identification;

(b) computer means adapted for receiving and processing said record data and said property data;

(c) retrieval means being adapted for accessing said bar coded record data for one or more workers entering and leaving said workplace during the collection period, and further being adapted for interfacing with said computer means for the selective transport of said record data of said one or more workers thereto; and (d) analysis means adapted for measuring said radiation and providing radiation property data on materials collected by said collection means, and further being adapted for interfacing with said computer means for the transport of said property data thereto;

(e) said computer means being adapted for providing additional record data and for correlating all record data and said property data and calculating total radiation exposure levels for each of said one or more workers and reporting and/or forwarding the same to data storage or to further data processing facilities.

2. The system of claim 1 wherein said collection means comprises holder means adapted to contain filter means having bar code label means thereon containing record data, and wherein said retrieval means comprises bar code reading means.

3. The system of claim 2 wherein said holder means is also provided with bar code label means.

4. The system of claim 2 wherein said analysis means is adapted to receive said filter means and is provided with bar code reading means for recording record data from said label means on said filter means, said analysis means further being adapted for the transport of said record data to said computer means.

5. The system of claim 4 wherein carrier means is provided for said filter means, said carrier means having window means therein adapted for registration with said label means on said filter means for providing access thereto by said reading means.

6. The system of claim 5 wherein said filter means comprises a card having aperture means therethrough, filter element means affixed to said card and substantially covering said aperture means, and said label means being affixed to said card in a position removed from said filter element means.

7. The system of claim 6 wherein said analysis means is provided with a loading magazine adapted to hold a plurality of carrier means in a substantially vertically oriented stack, and wherein each said carrier means and said magazine are provided with cooperating locator means for aligning said window means with said reading means.

8. The method of obtaining reliable and accurate radiation exposure data for one or more workers who typically enter and exit at least one workplace one or more times during said one or more worker's workshifts, said method comprising:

a) taking at least one airborne particulate, filter sample within each workplace with air pressure differential operated filter sampling means, and incident and substantially concurrently thereto, retrieving and recording in computer means record data comprising sample identity, each worker identity, time of each entry and exit of each worker at each workplace, time of each sampling initiation and termination, and air flow rate through each sampling means;

b) placing each sample in radiation counting means which is provided with means for identifying each sample and relating the same to the aforesaid record data including sample identity in said computer means;

c) counting the radiation from each sample and transporting the count as property data to said computer means;

d) correlating said record data and property data within said computer means and calculating and reporting total radiation exposure of each said one or more workers during the sampling period.

9. The method of claim 8 wherein said sampling means comprises a differential pressure operated holder and filter means contained therein, wherein both said holder and filter means are provided with bar code identification indicia, wherein said filter means is placed in said counting means without regard to sample order or stacking sequence, and wherein said counting means has the capacity for and reads the bar code identification indicia directly from the filter means.

10. The method of claim 8 wherein said record data is obtained by bar code reading means from bar code label means associated with each sample, and wherein said record and property data are transported to computer means having the capacity for calculating from the property data, sampling period, and air flow rate, an α, β radiation exposure profile for the worker.

11. The method of claim 8 wherein said worker is provided with apparel worn, bar code worker identification, providing in each said workplace air sampling means having filter means, each said sampling means having bar code identification associated therewith, reading said sampling means bar code with bar code reading means at the time of sampling initiation and termination and recording as record data the sampling identification and times and dates of said ination and termination, reading said worker identification bar code with bar code reading means each time said worker enters or exits a workplace and recording as record data the worker indentification and the time and dates of each of said entries and exits, transporting said record data to a programmed computer, placing said filter means in said radiation counting means, counting the radiation from said filter means and transporting the count as property data along with the filter means identification record data to said computer, correlating said record data and property data within said computer and calculating and reporting radiation exposure of said worker.

12. The method of claim 11 wherein said sampling means comprises a suction operated holder for said filter means contained therein, wherein both said holder and filter means are provided with bar code identification, wherein said filter means is placed in said counting means without regard to sample order or stacking sequence, and wherein said counting means has the capacity for and reads the bar code identitifcation directly from said filter means.

13. The method of obtaining reliable and accurate readiation exposure data for a worker who typically enters and exits at least one workplace one or more times during said worker's workshift, said method comprising the steps of:

a) at the beginning of each work activity, loading an air filter for particulate materials into a holder which is provided with a bar code label carrying holder location data, the holder being selectively located within a workstation area to provide a highly representative sampling of actual work air-inhalation;

b) after loading the filter, scanning the holder label with a programmed bar code reader to record the holder workstation location and the time and date of scanning;

c) actuating the holder by placing in communication with a pressure differetial system via an in-line flow meter which controls and monitors the air flow rate through the filter;

d) repeating steps a) b) and c) for all such workplace air sampling locations;

e) at the end of a prescribed period, removing each filter from its holder (vacuum broken) and placing in an envelope which bears a bar code label identifying the particular sample carrier by number into which the filter is to be placed for counting;

f) scanning both the label on the holder and the label on the envelope with said reader and recording and correlating the data therefrom along with the time and date of scanning;

g) transporting the reader data to a programmed computer;

h) scanning the envelope label with a reader which gives a visual display of the identifying number of the carrier into which the filter is to be loaded;

i) loading the filters into the carriers and placing the carriers in numerical order in the magazine and actuating the counter;

j) after the couner has completed radioactivity (property data) analysis of each filter, importing the data as assigned to each carrier identification to the computer; and k) correlating the record data and property data in the computer and perfroming worker exposure analysis thereof and reporting the same.

14. The method of obtaining reliable and accurate radiation exposure data for a worker who typically enters and exist at least one workplace one or more times during said worker's workshift, said method comprising the steps of:

a) at the beginning of each work activity, a card having an air filter for particulate materials affixed thereto, and bearing a bar code label, is scanned by a programmed bar code reader which records the card identification;

b) the card is then loaded into a holder which is selectively located within a workstation area to provide a highly representative sampling of actual worker air-inhalation;

c) after loading the filter, the reader scans a bar code label attached to the holder and records its workstation location along with the time and date of scanning, the holder then immediately being actuated by placing in communication with a vacuum system via an in-line flow meter which contrlos and monitors the air flow rate through the filter;

d) steps a) b) and c) are repeated for all such workstations air sampling locations;

e) at the end of a prescribed period, each card is removed from its holder (vacuum broken) and the labels on the card and holder immediately scanned by the reader which records the time and date of scanning and correlates the same with the holder location, card identification, time and date of sampling initiation and termination, and any other relevant record data stored in the reader;

f) the reader than transports the record data to a PC;

g) each card is subsequently loaded into a sample carrier having a bar code viewing window, and the carriers then loaded into a radiation counter magazine, the counter being in communication with the PC for transport of property data thereto and is provided with an internal bar code reader which records the record data from the card label;

h) after the counter has completed radioactivity (property data) analysis of each filter, the PC imports the data as assigned to each card identification;

i) the PC then correlates the record data and property data, and performs worker exposure analysis thereof, and, if desired, prints reports of this analysis, or in the alternative, exports the data to a centralized database for further analysis, further correlation with other record data including the worker's medical status and history, and/or data storage.

15. The method of obtaining reliable and accurate radiation exposure data for a worker who typically enters and exits at least one workplace one or more times during said worker's workshift, said method comprising the steps of:

a) at the beginning of each work activity, a card having an air filter for particulate materials affixed thereto, and bearing a bar code label, is scanned by a programmed bar code reader which records the card identification, the card then being loaded into a holder which is then affixed to the worker's clothing proximate said worker's breathing zone to provide a highly representative sampling of the worker's actual air-inhalation;

b) the reader then scans a bar code label worn by the worker and records the worker identification along with the time and date of scanning;

c) the holder is then immediately actuated by placing in communication with a vacuum system worn by the worker, via an in-line flow meter which controls and monitors the air flow rate through the filter;

d) steps a) b) and c) are repeated for all such work station air sampling locations;

e) at the end of a prescribed period, each card is removed from its holder (vacuum broken) and the labels on the card and worker immediately scanned by the reader which records the time and date of scanning and correlates the same with the card and worker identification, and time and date of sampling initiation and termination;

f) the reader then transports the record data to a PC;

g) each card is subsequently loaded into a sample carrier having a bar code viewing window, and the carriers then loaded into a radiation counter magazine, the counter being in communication with the PC for transport of property data thereto and being provided with an internal bar code reader which records the record data from the card label;

h) after the counter has completed radioactivity (property data) analysis of each filter, the PC imports the data as assigned to each card identification;

i) the PC then correlates the record data and property data, and performs personnel exposure analysis thereof, and prints reports of this analysis, or in the alternative, exports the data to a centralized database for further analysis, further correlation with other record data, or to data storage.

16. A method for monitoring and analyzing workplace radioactivity levels to provide a measure of internal radiation dose which is representative of the exposure the worker received, this internal exposure being added to the external exposure or dose received by the worker, for providing an assignment of total radiation exposure for the worker, said method comprising:

1) bar code scanning a worker's identification and correlating the same in computer means with a first air filter sample identification;

2) obtaining said first air filter sample of particulate material representative of that actually breathed in by and constituting an internal radiation exposure for said worker over a period of time;

3) obtaining $\alpha$, $\beta$ radiation counts for said first sample and calculating a radiation exposure value for said worker and transmitting said exposure value to said computer means;

4) combining and correlating in said computer means said exposure value with internal radiation exposure values obtained from samples comprising one or more of instantaneous or incremental urine or feces, to give a summed internal radiation exposure value for said worker;

5) obtaining an external radiation exposure value for said worker;

6) correlating and combining in said computer means said internal and external exposure values to give a total radiation exposure value for said worker.

* * * * *

UNITED STATES PATENT AND TRADEMARK OFFICE
CERTIFICATE OF CORRECTION

PATENT NO. : 5,468,968
DATED : 11/21/95
INVENTOR(S) : William H. Bailey, et al.

It is certified that error appears in the above-identified patent and that said Letters Patent is hereby corrected as shown below:

Column 1, line 27, delete "for" and insert ---For---;

Column 4, line 45, delete the period and insert a semi-colon;

Column 13, line 39, delete "me" and insert ---means---;

Column 15, line 58, delete "iniation" and insert ---initiation---;

Column 16, lines 10 & 11, delete "readiation" insert ---radiation---;
          line 24, delete "differetial" and insert ---differential---;
          line 53, delete "perfroming" and insert ---performing---;

Column 17, line 7, delete "workstations" and insert ---workstation---;
          line 17, delete "than" and insert ---then---.

Signed and Sealed this

Ninth Day of April, 1996

Attest:

BRUCE LEHMAN

Attesting Officer     Commissioner of Patents and Trademarks